United States Patent
Sun et al.

(10) Patent No.: US 12,092,782 B2
(45) Date of Patent: Sep. 17, 2024

(54) METHOD AND SYSTEM FOR AUTOMATIC PICKING OF BOREHOLE ACOUSTIC EVENTS BASED ON NEW OBJECTIVE FUNCTION

(71) Applicant: SAUDI ARABIAN OIL COMPANY, Dhahran (SA)

(72) Inventors: Xuekai Sun, Beijing (CN); Christopher Ayadiuno, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 840 days.

(21) Appl. No.: 17/153,314

(22) Filed: Jan. 20, 2021

(65) Prior Publication Data

US 2022/0229202 A1    Jul. 21, 2022

(51) Int. Cl.
*G01V 1/50* (2006.01)
*E21B 7/04* (2006.01)

(52) U.S. Cl.
CPC .................. *G01V 1/50* (2013.01); *E21B 7/04* (2013.01); *G01V 2210/1299* (2013.01);
(Continued)

(58) Field of Classification Search
CPC .. G01V 1/50; G01V 1/305; G01V 2210/1299; G01V 2210/1429; G01V 2210/324; G01V 2210/6222; E21B 7/04
See application file for complete search history.

(56) References Cited

U.S. PATENT DOCUMENTS

| 4,594,691 A | 6/1986 | Kimball et al. |
| 5,537,365 A | 7/1996 | Sitoh |

(Continued)

FOREIGN PATENT DOCUMENTS

| WO | WO-2017106127 A1 * | 6/2017 | ............ G01V 1/362 |
| WO | 2018063156 A1 | 4/2018 | |

OTHER PUBLICATIONS

Yu, Zhi-Chao, and et al. "Arrival picking method for microseismic phases based on curve fitting." Applied Geophysics 17 (2020): 453-464 (Year: 2020).*

(Continued)

*Primary Examiner* — Douglas Kay
(74) *Attorney, Agent, or Firm* — Osha Bergman Watanabe & Burton LLP

(57) ABSTRACT

A method including obtaining, by a computer processor, a sonic waveform for each of a plurality of source and receiver positions along a borehole, and a sonic wave propagation velocity of a target event for the plurality of positions. Further, performing, a linear moveout correction on the sonic waveforms based on the velocity and stacking the linear moveout corrected waveforms to generate a stacked waveform at the plurality of positions. The method further includes determining an arrival-time of the target event on the stacked waveforms based on an extremum of a first objective and predicting a candidate arrival-time of the target event for the sonic waveform at the plurality positions based on the arrival-time of the target event on the stacked waveforms, and the sonic velocity. The method still further includes determining an arrival-time for the target event on the sonic waveform at the plurality positions within the borehole based on the candidate arrival-time of the target event and an extremum of a second objective function.

19 Claims, 13 Drawing Sheets

(52) U.S. Cl.
CPC .......... *G01V 2210/1429* (2013.01); *G01V 2210/324* (2013.01); *G01V 2210/6222* (2013.01)

(56) References Cited

U.S. PATENT DOCUMENTS

| | | | |
|---|---|---|---|
| 6,477,112 B1* | 11/2002 | Tang | G01V 1/48 367/33 |
| 6,625,541 B1 | 9/2003 | Shenoy et al. | |
| 10,436,024 B2 | 10/2019 | Bakulin et al. | |
| 2002/0093879 A1 | 7/2002 | Mandal | |
| 2005/0128872 A1 | 6/2005 | Valero et al. | |
| 2010/0177595 A1 | 7/2010 | Khare et al. | |
| 2013/0215717 A1* | 8/2013 | Hofland | G01V 1/288 367/59 |
| 2015/0331134 A1 | 11/2015 | Haldorsen et al. | |
| 2019/0361138 A1* | 11/2019 | Bennett | G01V 1/52 |
| 2020/0003922 A1* | 1/2020 | Bennett | G01V 1/48 |

OTHER PUBLICATIONS

Li, Lei, and et al. "Recent advances and challenges of waveform-based seismic location methods at multiple scales." Reviews of Geophysics 58, No. 1 (2020): e2019RG000667 (Year: 2020).*

Long, Yun, and et al. "Fast-AIC method for automatic first arrivals picking of microseismic event with multitrace energy stacking envelope summation." IEEE Geoscience and Remote Sensing Letters 17, No. 10 (2019): 1832-1836 (Year: 2019).*

"Wireline & Perforating Services Catalog", Halliburton, Nov. 2019, URL: <https://www.halliburton.com/content/dam/ps/public/lp/contents/Books_and_Catalogs/web/wireline-and-perforating-services-catalog.pdf> (423 pages).

Kimball, Christopher V. and Thomas L. Marzetta, "Semblance processing of borehole acoustic array data", Geophysics, Society of Exploration Geophysicists, vol. 49, No. 3, Mar. 1984, pp. 274-281 (8 pages).

Hornby, Brian E., "Tomographic reconstruction of near-borehole slowness using refracted borehole sonic arrivals", Geophysics, Society of Exploration Geophysicists, vol. 58, No. 12, Dec. 1993, pp. 1726-1738 (13 pages).

Close, D. et al., "The Sound of Sonic: A Historical Perspective and Introduction to Acoustic Logging", CSEG Recorder, May 2009, pp. 35-43 (10 pages).

Market, Jennifer and Joanne Tudge, "A Layman's Guide to Acoustic Anisotropy", SPWLA 58th Annual Logging Symposium, Society of Petrophysicists and Well Log Analysts, Jun. 2017, pp. 1-25 (25 pages).

Tang, X.M. and D. Patterson, "Shear Wave Anisotropy Measurement Using Cross-dipole Acoustic Logging: An Overview", Petrophysics, Society of Professional Well Log Analysts, vol. 42, No. 2, Mar.-Apr. 2001, pp. 107-117 (11 pages).

Zeroug, Smaine et al., "Monopole radial profiling of compressional slowness", SEG/New Orleans 2006 Annual Meeting, pp. 354-358 (5 pages).

International Search Report and Written Opinion issued in Application No. PCT/US2022/013101, mailed on Apr. 25, 2022 (15 pages).

* cited by examiner

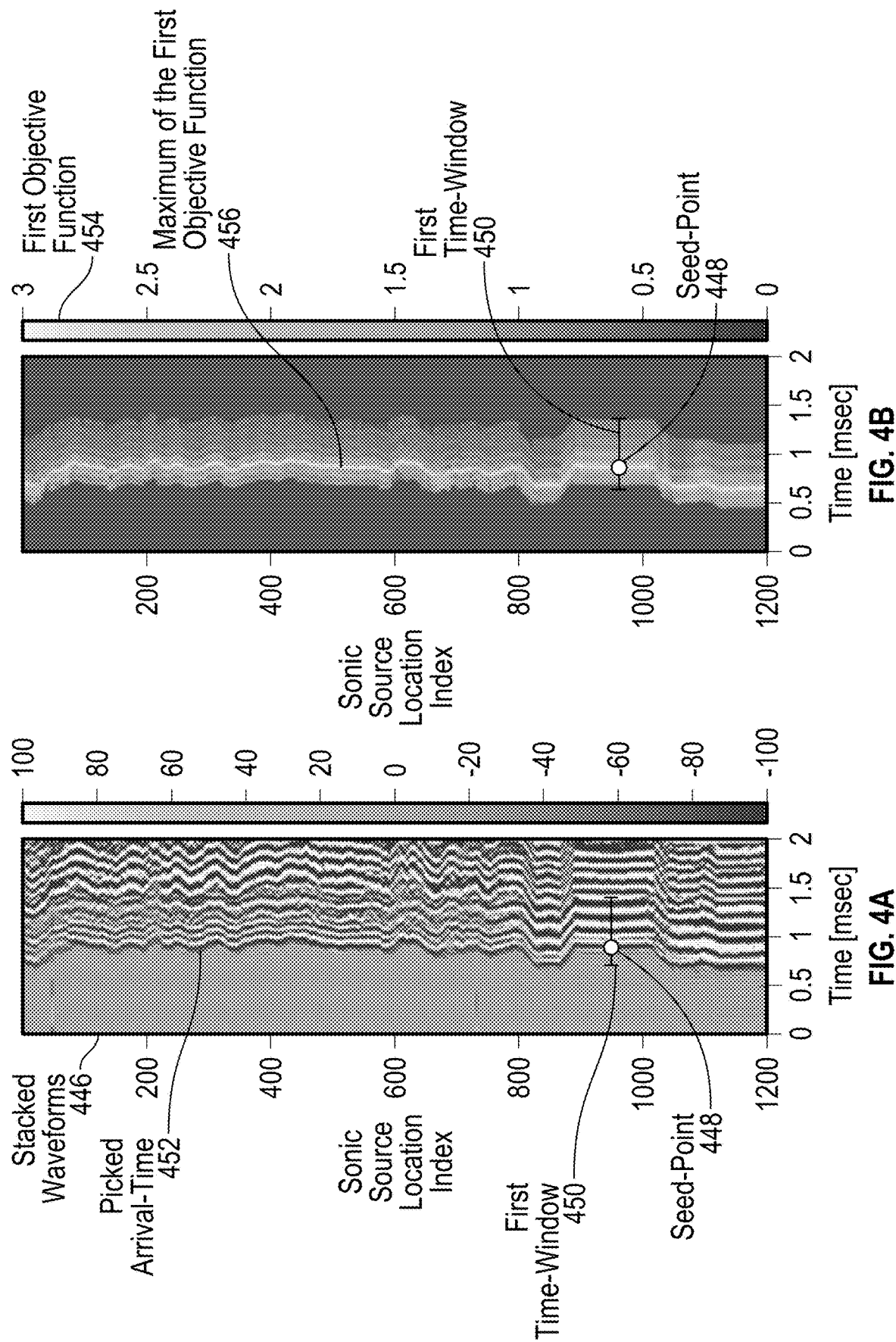

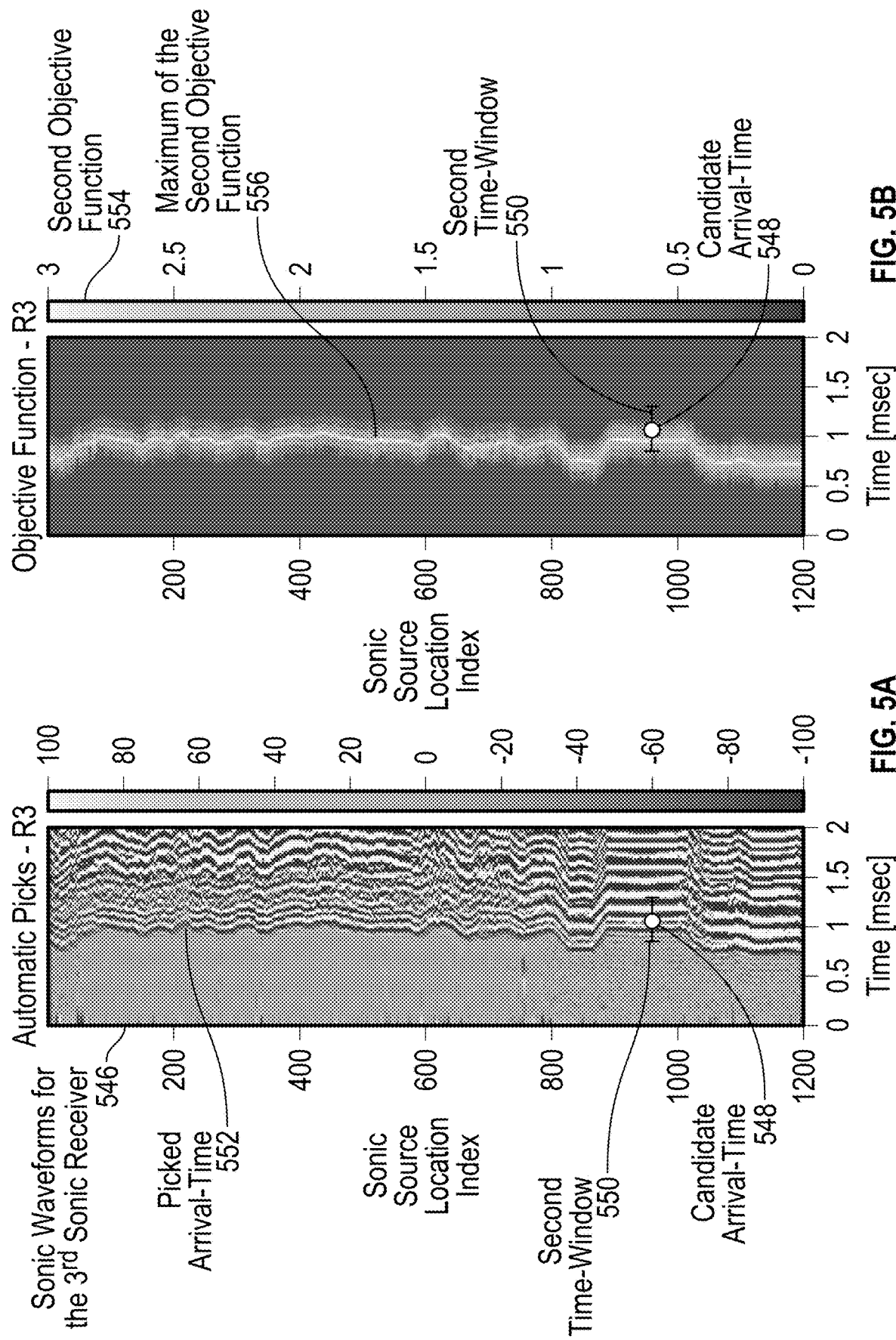

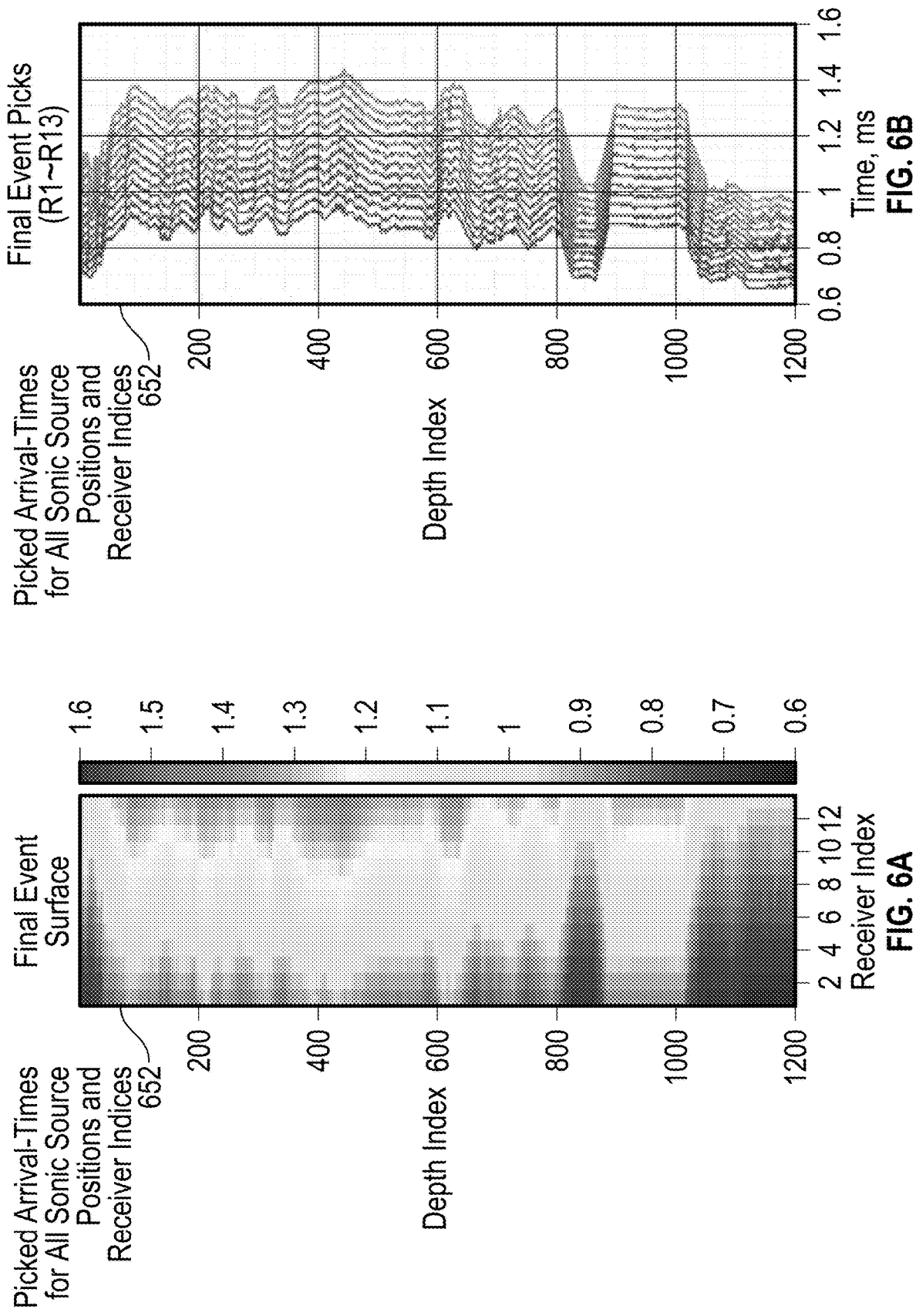

METHOD AND SYSTEM FOR AUTOMATIC PICKING OF BOREHOLE ACOUSTIC EVENTS BASED ON NEW OBJECTIVE FUNCTION

BACKGROUND

Engineers and geoscientists working in the oil and gas industry frequently need to know the characteristics of sonic wave propagation in subsurface rock formations to inform their decision about whether, and where, to drill boreholes to find and produce hydrocarbons. To determine these characteristics sonic tools may be deployed in borehole traversing the subsurface rock formation suspended from the surface on wireline cables or attached to drillstrings. Sonic tools typically have at least one sonic source to generate sonic waves and a plurality of sonic receivers to detect and record sonic waves.

To provide useful information about the subsurface rock formations sonic wave recordings may be processed to mitigate noise and determine characteristics of the sonic wave propagation including, without limitation, sonic wave type, sonic wave propagation velocity, and arrival-time at the receiver.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method, including obtaining, by a computer processor, a plurality of sonic waveforms for each of a plurality of source and receiver positions along a borehole, and a sonic wave propagation velocity curve of a target event for the plurality of positions. Further, the method includes performing a linear moveout correction on the sonic waveforms based on the sonic velocity, and stacking the linear moveout corrected waveforms to generate a stacked waveform at the plurality of positions. The method further includes determining an arrival-time of the target event on the stacked waveforms based on an extremum of a first objective and predicting a candidate arrival-time of the target event for the sonic waveform at the plurality positions based on the arrival-time of the target event on the stacked waveforms, and the sonic velocity. The method still further includes determining an arrival-time for the target event on the sonic waveform at the plurality positions within the borehole based on the candidate arrival-time of the target event and an extremum of a second objective function.

In general, in one aspect, embodiments relate to a non-transitory computer readable medium storing instructions executable by a computer processor, the instructions including functionality for obtaining a sonic waveform for each of a plurality of source and receiver positions along a borehole, and a sonic wave propagation velocity of a target event for the plurality of positions. Further, the instructions include functionality for performing a linear moveout correction on the sonic waveforms based on the sonic velocity, and stacking the linear moveout corrected waveforms to generate a stacked waveform at the plurality of positions. The instructions further include functionality for determining an arrival-time of the target event on the stacked waveforms based on an extremum of a first objective and predicting a candidate arrival-time of the target event for the sonic waveform at the plurality positions based on the arrival-time of the target event on the stacked waveforms, and the sonic velocity. The instructions still further include functionality for determining an arrival-time for the target event on the sonic waveform at the plurality positions within the borehole based on the candidate arrival-time of the target event and an extremum of a second objective function.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 4A and 4B show stacked waveforms and objective function in accordance with one or more embodiments.

FIGS. 5A and 5B show sonic waveforms and objective function in accordance with one or more embodiments.

FIGS. 6A, 6B, 6C, and 6D show time-picks and QC metrics in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a novel method and system for obtaining an objective function that is efficient and robust for automatic picking and tracking of borehole acoustic waveform events. This new objective function integrates four different measures—semblance, phase, energy ratios and pick consistency—and serves as the kernel for a two-pass application of automatic picking schemes implemented on a stacked waveform and a common-receiver-gather, respectively. More specifically, the new objective function is formed by a workflow including the following steps: first, linear moveout correction is performed on each shot-gather to approximately align the sonic waveforms in time and the approximately aligned sonic waveforms are then stacked to highlight a target event. Next, a seed-point is determined, and using this data point, a first pass automatic event picking on the stacked waveform is performed to generate a 1D initial pick vector. Subsequently, an initial 2D event surface is obtained by extending the 1D initial pick vector to each receiver based on the velocity information of the target wave. Lastly, the second pass of automatic picking is implemented on a common receiver configuration to yield the final result by optimizing the initial 2D event surface. These steps will be explained below with respect to FIGS. 1-8.

Figure 1:
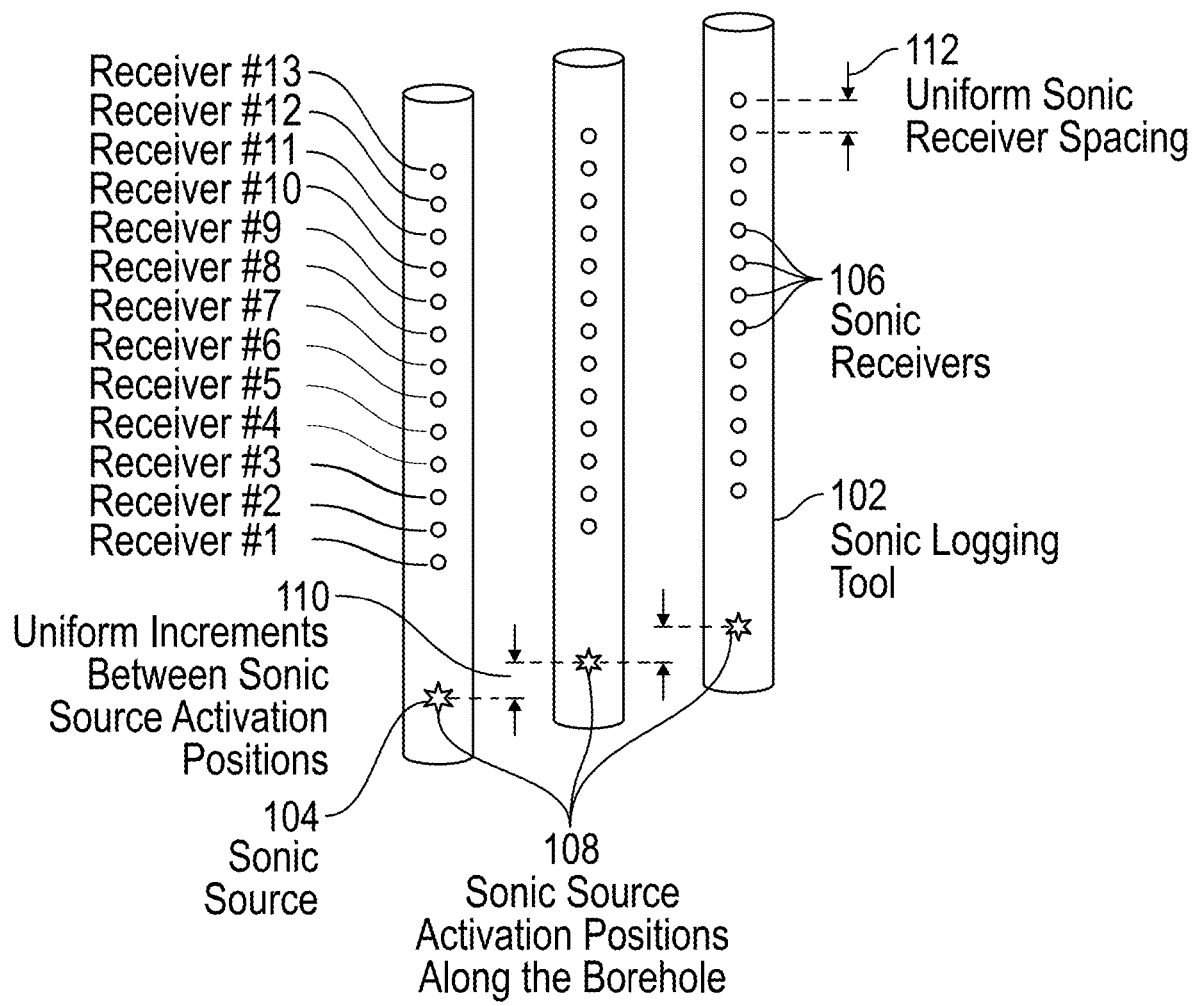
FIG. 1 shows a sonic logging tool moving along a borehole in accordance with one or more embodiments.

FIG. 1 shows a sonic logging tool (102), in accordance with one or more embodiments, at three different sonic source activation positions (108) within a borehole traversing a subsurface rock formation. A sonic logging tool (102) may be inserted into the borehole on a wireline cable, on slick-line, as part of the bottomhole assembly (BHA) of a drillstring, on a wireline cable through drillpipe, or on coil tubing. In the exemplary embodiments shown, the sonic logging tool (102) has one sonic source (104) for controllably radiating sonic waves. In other embodiments, the sonic logging tool (102) may have a plurality of sonic sources for controllably radiating sonic waves. In the exemplary embodiments shown, the sonic tool has thirteen (13) sonic receivers (106) for detecting and recording propagating sonic waves. In other embodiments, the sonic logging tool (102) may have a greater, or a lesser number of sonic receivers. The sonic sources (104) may be positioned at a single axial position on the sonic logging tool (102), in accordance with one or more embodiments. In other embodiments, the sonic sources (104) may be positioned at different axial positions on the sonic logging tool (102). Typically, the sonic receivers (106) may be spaced uniformly (112), with a spacing between 2 inches and 8 inches. However, in other cases, the sonic receiver (106) spacing may be irregular and/or random.

The sonic logging tool (102 may be operated by activating the sonic source (104) at a particular axial position within the borehole, and at a particular activation time. After activating the sonic source (104), a sonic wave is emitted by the sonic source, and this sonic wave may be subsequently detected and recorded at each of the sonic receivers (106) over a subsequent time-window. More specifically, a time-series of sonic wave amplitudes is detected and recorded by the sonic receivers (106). The sonic logging tool (102) may then be moved axially along the borehole and the sonic source (104) activation and sonic receiver (106) detection and recording procedure repeated at adjacent positions along the borehole (108). The sonic source (104) firing and the sonic receiver (106) detection and recording may occur while the sonic logging tool (102) is stationary within the borehole, but more typically, the sonic source (104) firing and the sonic receiver (106) detection and recording may occur while the sonic logging tool (102) is in continuous axial motion along the borehole. Generally, the axial separation between the sonic source activation positions (108) are separated by a uniform increment (110) which may be similar to the distance between sonic receiver (106) positions in the sonic logging tool (102).

The time-series of sonic disturbance amplitudes recorded by each sonic receiver (106) for each sonic source (104) activation is denoted as a "sonic waveform". In accordance with one or more embodiments the disturbance amplitude recorded by each sonic receiver (106) may be a pressure, or a pressure fluctuation caused by the sonic wave. In other embodiments, the disturbance amplitude may be particle velocity, or particle acceleration.

Figure 2A:
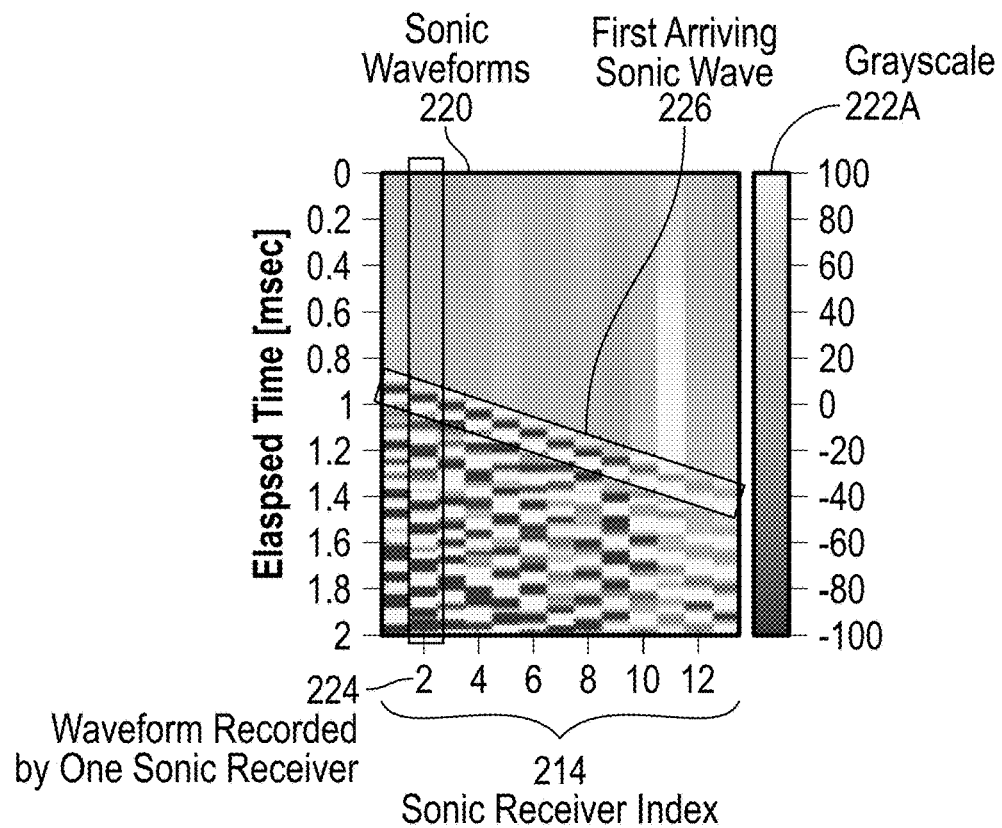
FIGS. 2A, 2B, 2C, and 2D show sonic waveforms, a spectrum, and sonic velocity curve in accordance with one or more embodiments.

FIG. 2A shows an array of sonic waveforms (220), in accordance with one or more embodiments. The sonic disturbance amplitude is shown on the grayscale (222A), the abscissa enumerates the sonic receiver index (214), and the ordinate shows the elapsed time after the activation of the sonic source. Each column of FIG. 2A depicts the waveform recorded by one sonic receiver of the receiver index (214) that makes up the x-axis of the graph shown. The sonic receiver (106) with index=1 is located closest to the sonic source (104), and the sonic receiver (106) with index=13 is located furthest from the sonic source (104). In FIG. 2A, the 13 sonic waveforms (220) shown are recorded by 13 sonic receivers (106) located adjacent to one another on the sonic logging tool (102). The sonic waveforms (220) shown in FIG. 2A are caused by a single activation of a sonic source. The first arriving sonic wave (226) can be seen passing the plurality of sonic receivers, starting at approximately 0/9 milliseconds (msec) at the sonic receiver (106) with index=1 and ending at approximately 1.3 msec at the sonic receiver (106) with index=13. Later arriving sonic waves contribute to the sonic waveforms at later times.

Figure 2B:
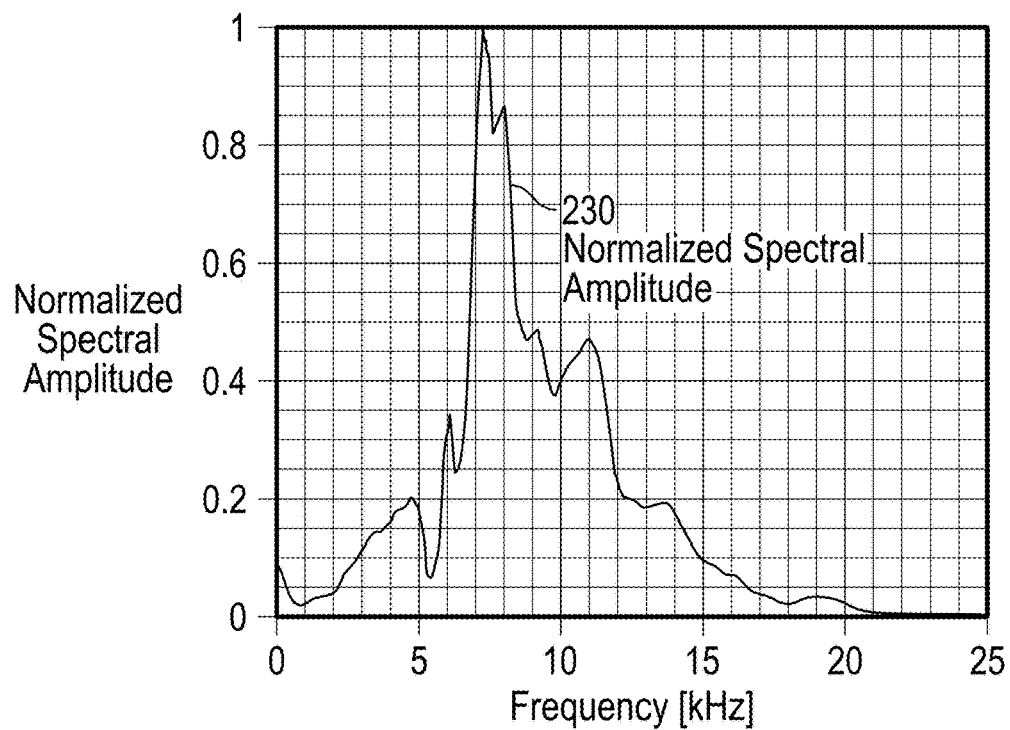

FIG. 2B shows an exemplary embodiment of the normalized spectral amplitude (230) of one of the sonic waveforms (220) shown in FIG. 2A. In the example of FIG. 2B, the maximum normalized spectral amplitude (230) is located at approximately 7 kHz. In other embodiments, the maximum normalized spectral amplitude (230) may be at a lower frequency, such as 2 kHz or lower, or at a higher frequency, such as 20 kHz or higher.

Figure 2C:
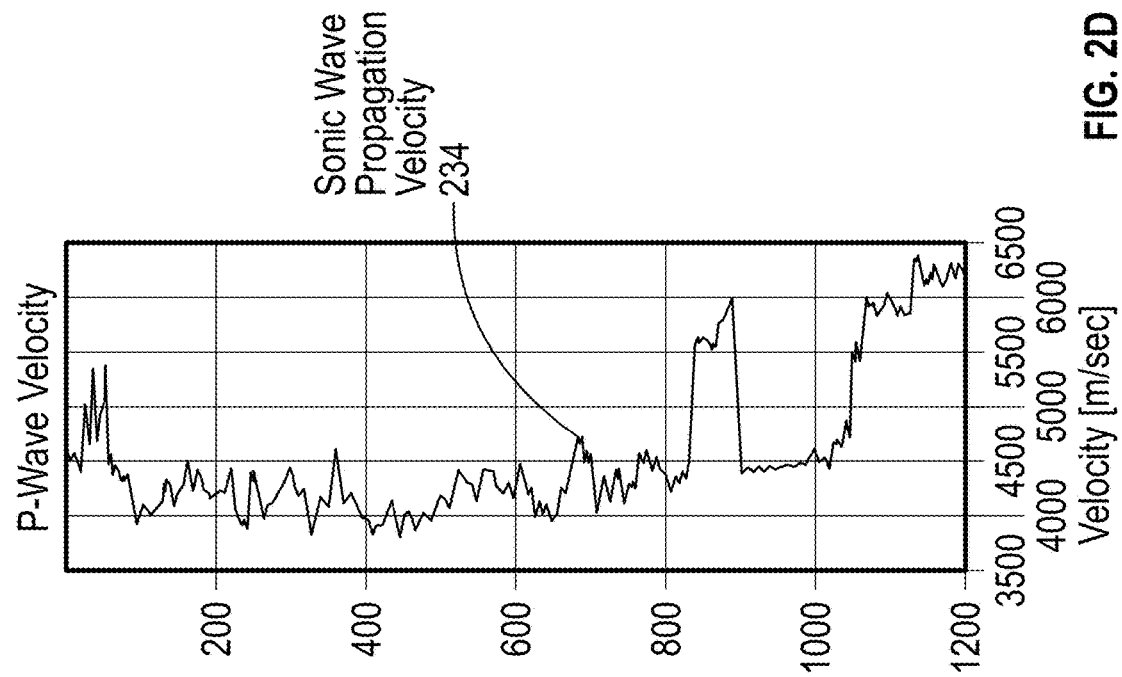

FIG. 2C shows the sonic waveform recorded by the sonic receiver with index=1 (228), for a plurality of sonic source activation positions (108) along the borehole (108). In FIG. 2C the sonic disturbance amplitude is shown on the grayscale (222B), the abscissa shows the elapsed time after the activation of the sonic source (104), and the ordinate enumerates the sonic source activation positions along the borehole (108). Each row of FIG. 2C depicts the waveform recorded by the sonic receiver (106) with index=1, for a single firing of the sonic source (104). Each waveform shown in FIG. 2C corresponds to a sonic source—sonic receiver geometry with the same spatial separation between the sonic source (104) and sonic receiver (106). Since the sonic source (104) and sonic receiver (106) are both rigidly attached to the sonic logging tool (102), the sonic receiver (106) moves from one axial position in the borehole to the next axial position at the same rate at which the sonic source (104) moves from one axial position to the next axial position. Thus, the spatial distance between the sonic source (104) and the sonic receiver (106) remain unchanged.

On each sonic waveform (228) at early time the sonic disturbance amplitude varies smoothly and slowly with time. This is the manifestation of low temporal-frequency noise on the sonic waveform. A little before an elapsed time of 1 msec the character of the sonic waveform (228) changes, showing a rapid oscillation of amplitude. This rapid oscillation is the manifestation of the first arriving sonic wave (232) on the sonic waveform (228). Later in the sonic waveform (228) more subtle changes in oscillation amplitude and frequency occur. These later changes are the manifestation of later arriving sonic waves on the sonic waveform (220).

Figure 2D:
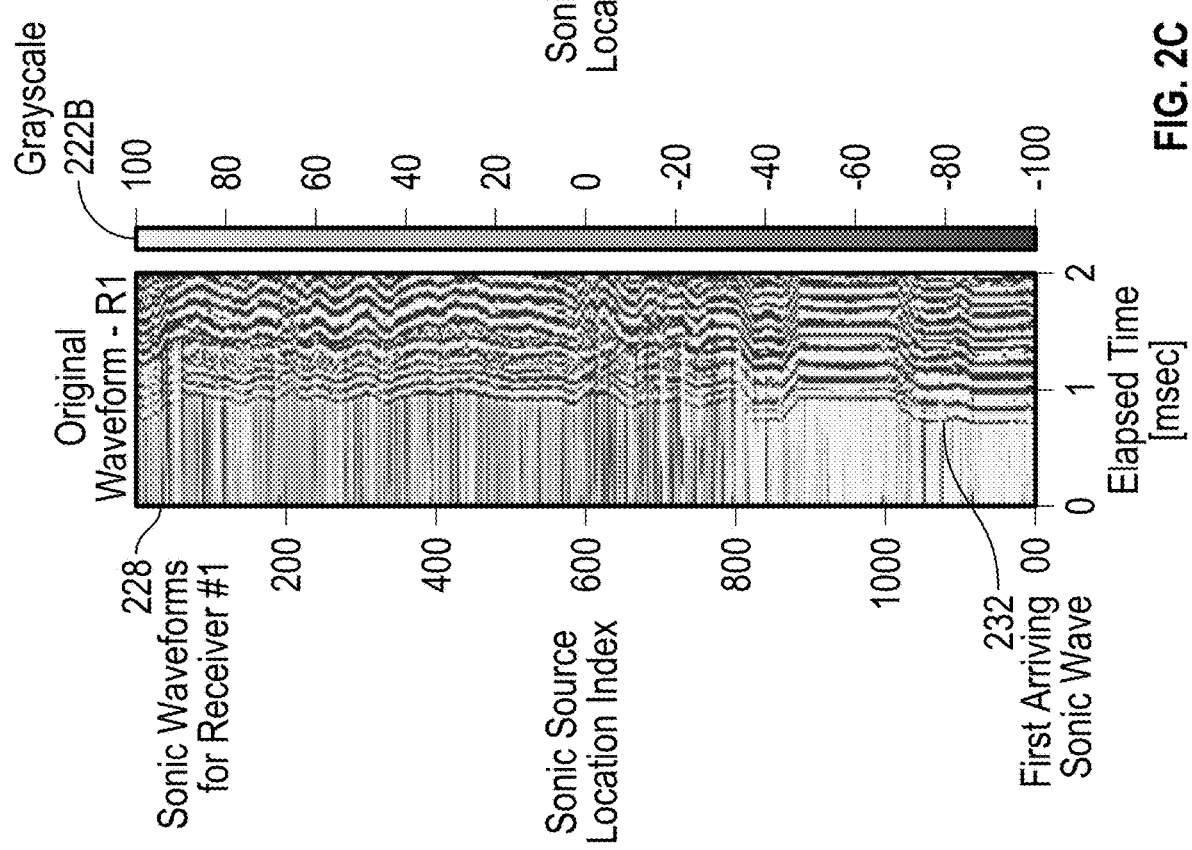

The first arriving sonic wave (232) visible on FIG. 2C arrives at different times for different sonic source activation positions (108), even though the sonic source ((104)) to sonic receiver (106) spatial separation remains unchanged, as described above. Thus, one may conclude that the changing arrival-time of the first arriving sonic wave (232) is due to a change sonic wave propagation velocity (234) of the subsurface rock formation at different sonic source activation positions (108) along the borehole. An exemplary embodiment of the sonic wave propagation velocity (234) is shown in FIG. 2D.

Figure 3A:
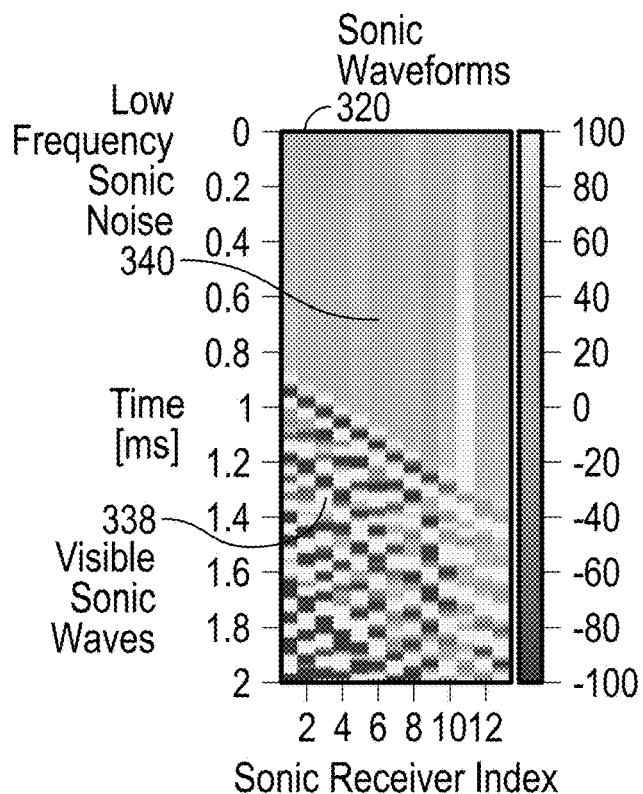
FIGS. 3A, 3B, 3C, and 3D show sonic waveforms in accordance with one or more embodiments.
Figure 3B:
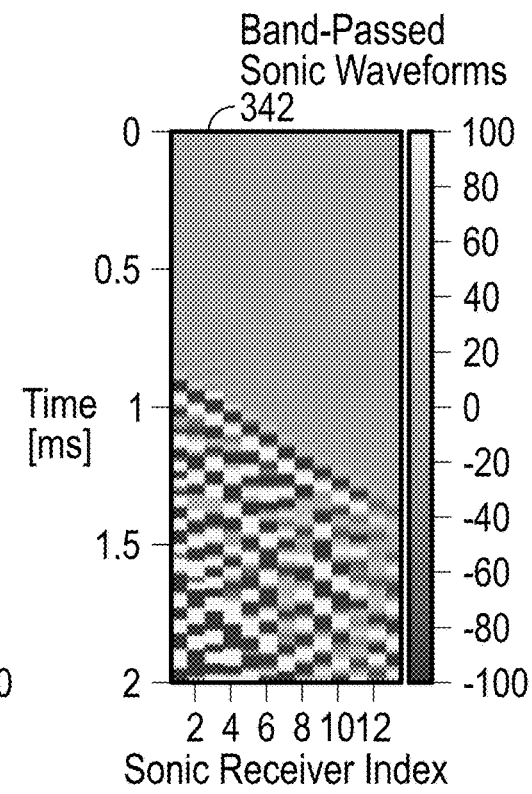

FIG. 3A shows the same sonic waveforms (320) depicted in FIG. 2A. In addition to the sonic waves visible (338) in the later portion of the sonic waveforms (320), low frequency sonic noise (340) is visible in the earlier portion of the sonic waveforms (320). In many cases, the low frequency noise (340) is also present in the later portions of the sonic waveforms (320), but masked or less visible because of the presence of the sonic waves (338). In accordance with one or more embodiments, the sonic waveforms (320) may be band-pass filtered to remove the low frequency noise (340), to produce band-passed sonic waveforms (342) shown in FIG. 3B.

In accordance with one or more embodiments, a linear moveout correction may be applied to a plurality of sonic waveforms (320, 342) resulting from a single activation of the sonic source (104). A linear moveout correction includes selecting a sonic wave propagation velocity (234) for a target event. The target event may be a first arriving sonic wave (232), or the target event may a later arriving, and slower propagating, sonic wave. The sonic wave propagation velocity (234), $v_T$, is specified as input to the linear moveout correction. In accordance with one or more embodiments, $v_T$ may be determined from prior analysis of the sonic waveforms (320, 343), or in accordance with other embodiments, $v_T$ may be selected from a group of trial values of the sonic wave propagation velocity (234). A linear moveout correction may align, or approximately, align in time the target event on each of the sonic waveforms.

Figure 3C:
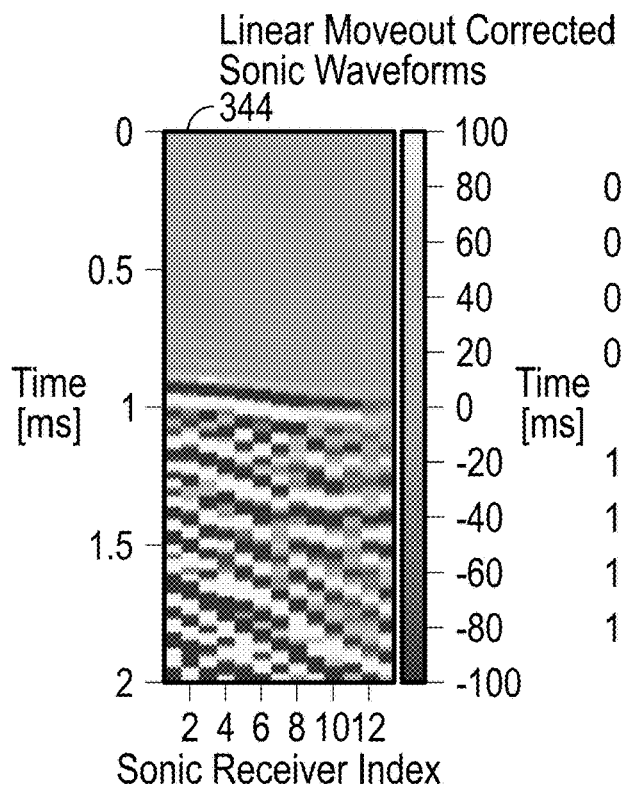

In addition, in accordance with one or more embodiments, a reference sonic source (104) to sonic receiver (106) distance, $x_0$, may be specified as input to the linear moveout correction. Frequently, $x_0$ may be chosen to be the distance between the sonic source (104) and the sonic receiver (106), but many other values of $x_0$ may be used. The linear moveout correction may then be applied by shifting the elapsed time of each sample of the sonic waveform to an earlier time, wherein the duration of the shift, $\Delta t_i$, for the sonic waveform with index=i, is given by:

$$\Delta t_i = (x_i - x_0) v_T \quad \text{Equation (1)}$$

where $x_i$ is the distance between the sonic source (104) and the $i^{th}$ sonic receiver. FIG. 3C shows the linear moveout corrected sonic waveforms (344) obtained by applying a linear moveout correction to the band-pass filtered sonic waveforms shown in FIG. 3B. FIG. 3C shows the approximately align in time of the target event on each of the sonic waveforms after linear moveout correction.

In accordance with one or more embodiments, the linear moveout corrected sonic waveforms (344) may be combined in a process denoted "stacking" to produce a stacked waveform (346). Many forms of stacking are known to one of ordinary skill in the art. A simple implementation of stacking, according to one or more embodiments involves summing the $n^{th}$ sample from each waveform to be stacked to give the value of the $n^{th}$ sample in the stacked waveform (346). For example, the $1^{st}$ sample from each waveform to be stacked are summed to obtain the $1^{st}$ sample in the stacked waveform (346). Similarly, the $11^{th}$ sample from each waveform to be stacked are summed to obtain the $11^{th}$ sample in the stacked waveform (346).

In other embodiments, the operation of summing the sample may be replaced by averaging the samples. For example, the averaging operation may include, without limitation, forming the mean, mode, median, harmonic mean, geometric mean, weighted-mean, weighted-mode, weighted-median, weighted-harmonic mean, weighted-geometric mean, trimmed-mean, trimmed-median, trimmed-harmonic mean, or trimmed-geometric mean.

Figure 3D:
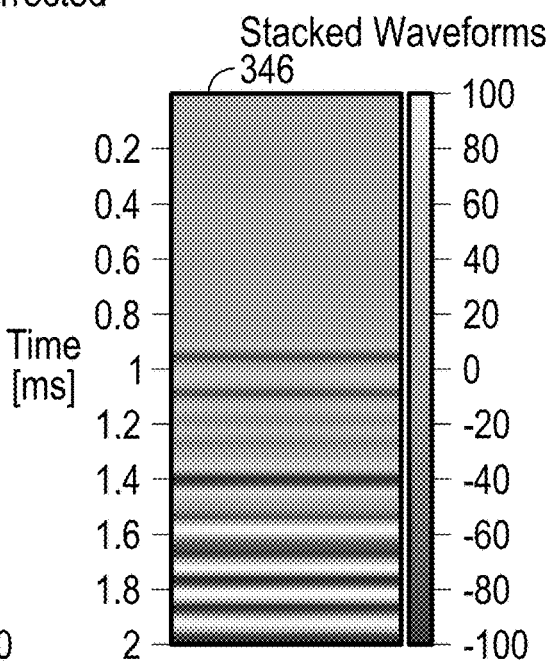

FIG. 3D shows the stacked waveform (346) resulting from stacking the linear moveout corrected, band-pass filtered sonic waveforms shown in FIG. 3C. In FIG. 3D the same stacked waveform (346) has been displayed in 13-fold duplicate side-by-side to facilitate comparison with the sonic waveforms (320) in FIG. 3A, the band-pass filtered sonic waveforms (342) in FIG. 3B, and the linear moveout corrected waveforms (344) in FIG. 3C.

In accordance with one or more embodiments, FIG. 4A shows the stacked waveforms (446) for a plurality of sonic source activation positions along the borehole (108). In addition, in accordance with one or more embodiments, FIG. 4A shows a seed-point (448) specified on one selected stacked waveform (446) chosen from the plurality of stacked waveforms (446). Picking the arrival-time (452) of the target event on the stacked waveforms (446) may proceed iteratively from the stacked waveform on which the seed-point (448) is selected, to a lower index (shallower) stacked waveform, and to a greater index (deeper) stacked waveform. The stacked waveform on which the arrival-time of the target event is to be picked may be denoted the current waveform, C (it), where it indexes time samples. After the arrival-time (452) of the target event has been picked on the current waveform, the current waveform may be time-shifted to align the target event with the previously picked target event on other stacked waveforms (446). The time-shifted current waveform may be added to a group of arrival-time aligned stacked waveforms (446), denoted reference waveforms, R(it, iz), where iz indexes axial position along the borehole (depth) samples. The arrival-time (452) of the target event on each of the reference waveforms are aligned with one another.

In some embodiments, a current waveform may be selected as the stacked waveform closest in axial borehole position to the reference waveforms above (at a shallower depth) the reference waveforms. In other embodiments, the current waveform may be the closest stacked waveform to the reference waveforms below (at a deeper depth) the reference waveforms.

In accordance with one or more embodiments, a first time-window (450) may be selected surrounding the seed-point (448), as shown in FIG. 4A. The first time-window (450) may be symmetrically disposed around the seed-point (448), such that the seed-point (448) is located at the center of the first time-window (450), or in other embodiments the first time-window (450) may be asymmetrically disposed around the seed-point (448). In accordance with one or more embodiments, the duration first time-window (450) may be chosen to enclose between 4 and 6 cycles of the stacked waveforms (446).

In accordance with one or more embodiments, a first objective function (454) may be formed from the samples of the current waveform and the reference waveforms. The first objective function (454), $O_1$, may be written as:

$$O_1 = (w_{S1}M_S + w_{P1}M_P + w_{R1}M_R) * M_C \qquad \text{Equation (2)}$$

where $w_{s1}$, $w_{P1}$, and $w_{R1}$ are scalar weights, which may be selected by the user. These weights may be selected to differ from one another, or they may be selected to be identical to one another. All the weights may be select to be unity.

The vector $M_S(dt)$ quantifies the semblance between the current stacked waveform, C(it), and the reference waveform, R(it, iz), and may be written as:

$$M_S(dt) = \sum_{it} \sum_{iz} \frac{(R(it, iz) + C(it - dt))^2}{(R(it, iz)^2 + C(it - dt)^2)} \qquad \text{Equation (3)}$$

where dt is a time-shift between the current waveform and the reference waveforms, and the summation over it includes the time samples within the first time-window (450), and the summation over iz includes a portion of the reference waveforms. The portion of the reference waveforms may include one or more of the reference waveforms closest to the current waveform.

The vector $M_P(dt)$ quantifies the phase consistency between the current stacked waveform and the reference waveform and may be written as:

$$M_P(dt) = \sum_{it} \frac{1}{\sum_{iz} |R(it, iz) - C(it - dt)| + \mu} \qquad \text{Equation (4)}$$

where $\mu$ is a small pre-whitening scalar, introduced to ensure numerical stability, and the summation over it includes the time samples within the first time-window (450), and the summation over iz includes a portion of the reference waveforms. The portion of the reference waveforms may include one or more of the reference waveforms closest to the current waveform.

The vector $M_R(dt)$ quantifies the differences in the energy ratio between the current waveform and the reference waveform and may be written as:

$$M_R(dt) = 1 - \frac{\sum_{iz} |E_R(iz) - E_C|}{\sum_{iz} (E_R(iz) + E_C)} \qquad \text{Equation (5)}$$

where $E_R(iz)$ and $E_C$ are the energy ratios of the reference waveforms and the current waveform within the first time-window (450), respectively, and the summation over iz includes a portion of the reference waveforms. The portion of the reference waveforms may include one or more of the reference waveforms closest to the current waveform.

The vector $M_C(dt)$ quantifies the pick consistency between the current stacked waveform and the reference waveform and may be written as:

$$M_C(dt) = \frac{1}{1 + M_j} \qquad \text{Equation (6)}$$

wherein:

$$M_j(dt) = \frac{1}{T_C * N_z} \sum_{iz} |P_R(iz) - dt| \qquad \text{Equation (7)}$$

where $P_R(iz)$ is the arrival-time (452) picked for the $iz^{th}$ reference waveform, dt, is the candidate time-shift of the current waveform. $T_c$ is the duration of one period of the peak frequency of the waveform spectrum and $N_Z$ is the number of waveforms in the portion of reference waveforms included in the summation.

In accordance with one or more embodiments, the value of the first objective function (454), $O_1$, is determined for a range of values of the time-shift dt. The time-shift may include both positive and negative time-shifts, or may include either positive or negative time-shifts. In accordance with one or more embodiments, the maximum value of $O_1$, may be determined and the value of the time-shift, dt, at which this maximum is located is the added to the arrival time of the target event in the reference waveforms to determine the arrival time of the target event in the current waveform. The time-shifted current waveform may be added to the previously identified reference waveforms, and a new current waveform selected.

One of ordinary skill in the art will readily appreciate that the first objective function (454) shown in equation (2) may be modified to become:

$$\widetilde{O_1} = L - (w_S M_S + w_P M_P + w_R M_R) * M_C \qquad \text{Equation (9)}$$

where L is any sufficiently large scalar value. The process of finding a maximum of $O_1$ given by equation (2) is now completely equivalent to the process of finding a minimum of $\widetilde{O_1}$ given by equation (9). Those skilled in the art will appreciate that regardless of the variations and/or alternate forms of the objective function that may be employed, the overall scope of the invention is not substantively changed.

In accordance with one or more embodiments, FIG. 4B shows the value of the first objective function (454 obtained using equation (2), together with the seed-point (448) and the first time-window (450) surrounding the seed-point (448). The value of the objective function is shown on the grayscale. The white line represents the maximum of the first objective function (456) for each of the stacked waveforms (446). The picked arrival-time (452) for the target event for each of the stacked waveforms (446) is plotted on FIG. 4A.

According to one or more embodiments, after the arrival-time (452) for the target event, $T_{st}(iz)$, has been determined for a plurality of stacked waveforms (446), a "candidate" arrival-time for the target event on a sonic waveform, $T_{cand}(j, iz)$, at each of a plurality of sonic receivers (106) may be determined as:

$$T_{cand}(j,iz) = T_{st}(iz) + (x_j - x_0) v_T \qquad \text{Equation (10)}$$

where $x_j$ is the sonic source (104) to sonic receiver (106) distance for the $j^{th}$ sonic receiver, $x_0$ is the sonic source (104) to stacked waveform position, and $v_T$ is the target event velocity, as described in equation (1). $T_{cand}(j, iz)$ is denoted the expected candidate arrival-time of the target event on waveform of the $j^{th}$ sonic receiver (106) for the $iz^{th}$ sonic source activation, based upon the arrival-time (452) of the target event on the stacked waveforms (446) and the selected target event sonic wave propagation velocity (234).

FIG. 5A shows the sonic waveforms for the $3^{rd}$ sonic receiver (546) (see FIG. 1), in accordance with one or more embodiments. FIG. 5A also shows the candidate arrival-time (548) for the target event, $T_{cand}$ on one sonic waveform for the 3$^{rd}$ sonic receiver (546). FIG. 5A also shows a second time-window (550). The second time-window (550) may be selected surrounding the candidate arrival-time (548), $T_{cand}$, as shown in FIG. 5A. The second time-window (550) may be symmetrically disposed around the candidate arrival-time (548), $T_{cand}$, such that the candidate arrival-time (548), $T_{cand}$, is located at the center of the second time-window (550), or in other embodiments the second time-window (550) may be asymmetrically disposed around the candidate arrival-time (548), $T_{cand}$. In accordance with one or more embodiments, the duration second time-window (550) may be chosen to be of lesser duration than the first time-window (450), although in other embodiments the second time-window (550) may be of the same or longer duration than the first time-window (450).

Picking the arrival-time (552) of the target event, $T_{Pick}$, on a plurality of sonic waveforms for the 3$^{rd}$ sonic receiver (546) may proceed iteratively. In accordance with one or more embodiments, the sonic waveform for the 3$^{rd}$ sonic receiver (546) on which a candidate arrival-time (548) of a target event is selected may initiate the iterative procedure. Next, a lower index (shallower) sonic waveform for the 3$^{rd}$ sonic receiver (546), or a greater index (deeper) sonic waveform for 3$^{rd}$ sonic receiver (546), may be chosen. The sonic waveform for the 3$^{rd}$ sonic receiver (546) on which the arrival-time (552) of the target event, $T_{Pick}$, is to be picked may be denoted the current waveform, C(it), where it indexes time samples. After the arrival-time (552) of the target event, $T_{Pick}$, has been picked on the current waveform, the current waveform may be time-shifted to align the target event with the previously picked arrival-time of the target event on other sonic waveforms for the 3$^{rd}$ sonic receiver (546). The time-shifted current waveform may be added to a group of arrival-time aligned sonic waveforms, denoted reference waveforms, R(it, iz), where iz indexes sonic source positions along the borehole (108). The arrival-time (552) of the target event on each of the reference waveforms are aligned with one another.

In some embodiments, a current waveform may be selected as the sonic waveform for the 3$^{rd}$ sonic receiver (546) closest in axial borehole position to the reference waveforms above (at a shallower depth) the reference waveforms. In other embodiments, the current waveform may be the closest sonic waveform for the 3$^{rd}$ sonic receiver (546) to the reference waveforms below (at a deeper depth) the reference waveforms.

In accordance with one or more embodiments, a second objective function (554) may be formed from the samples of the current waveform and the reference waveforms. The second objective function (454), $O_2$, may be written as:

$$O_2 = (w_{S2}M_S + w_{P2}M_P + w_{R2}M_R) * M_C \quad \text{Equation (10)(11)}$$

where $w_{S2}$, $w_{P2}$, and $w_{R2}$ are scalar weights, which may be selected by the user. These weights may be selected to differ from one another, or they may be selected to be identical to one another. All the weights may be select to be unity. In accordance with one or more embodiments, the weights $w_{S2}$, $w_{P2}$, and $w_{R2}$ may be selected to be the same as the weights $w_{S1}$, $w_{P1}$, and $w_{R1}$ respectively, or in other embodiments they be selected to be different. The functions $M_S$, $M_P$, $M_R$ and $M_C$ retain the same meaning as defined earlier in equations (3), (4), (5), (6) and (7).

Just as the first objective function (454), $O_1$, from equation (2) could be modified to become $\widetilde{O_1}$ in equation (9) above, so the second objective function (554), $O_2$, can be similarly modified. Those skilled in the art will appreciate that regardless of the variations and/or alternate forms of the objective function that may be employed, the overall scope of the invention is not substantively changed.

In accordance with one or more embodiments, the value of the second objective function (554), $O_2$, is determined for a range of values of the time-shift dt. The time-shift may include both positive and negative time-shifts, or may include either positive or negative time-shifts. In accordance with one or more embodiments, the maximum value of $O_2$, may be determined and the value of the time-shift, dt, at which this maximum is located is the added to the arrival time of the target event in the reference waveforms to determine the arrival time (552) of the target event, $T_{Pick}$, in the current waveform. The time-shifted current waveform may be added to the previously identified reference waveforms, and a new current waveform selected.

In accordance with one or more embodiments, after the completion of the picking of the arrival-time (552) of the target event, $T_{Pick}$, on a plurality of sonic waveforms for the 3$^{rd}$ sonic receiver (546), the arrival-time of the target event, $T_{Pick}$, may be picked on a plurality of sonic waveforms for other sonic receivers, such as the 1$^{st}$, 2$^{nd}$, or 10$^{th}$ sonic receivers. In accordance with one or more embodiments, the arrival-time (552) may be picked on each sonic receiver in turn, beginning with the 1$^{st}$ sonic receiver. In other embodiments, the arrival-time (552) may be picked on each sonic receiver in any order. In other embodiments, the arrival-time (552) of the target event, $T_{Pick}$, may be picked on a plurality of sonic waveforms for all sonic receivers simultaneously.

In accordance with one or more embodiments, FIG. 6A shows the final picked arrival-times (652) for the target event for all sonic receivers (106) and all sonic source activation positions along the borehole (108), $T_{Pick}$(j, iz), where 1≤j≤Nr, and Nr denotes the total number of axial receiver positions on the sonic logging tool (102), and 1≤iz≤Ns, and Ns equals the number of sonic source activation positions along the borehole (108). In the example shown in FIG. 6A, Ns=1200. FIG. 6B shows the same final picked arrival-times (652) of the target event in a different format. Each line shows the final picked arrival-times (652) of the target event for a single sonic receiver (106) at a plurality of different sonic source activation positions along the borehole (108).

Figures 6C, 6D:
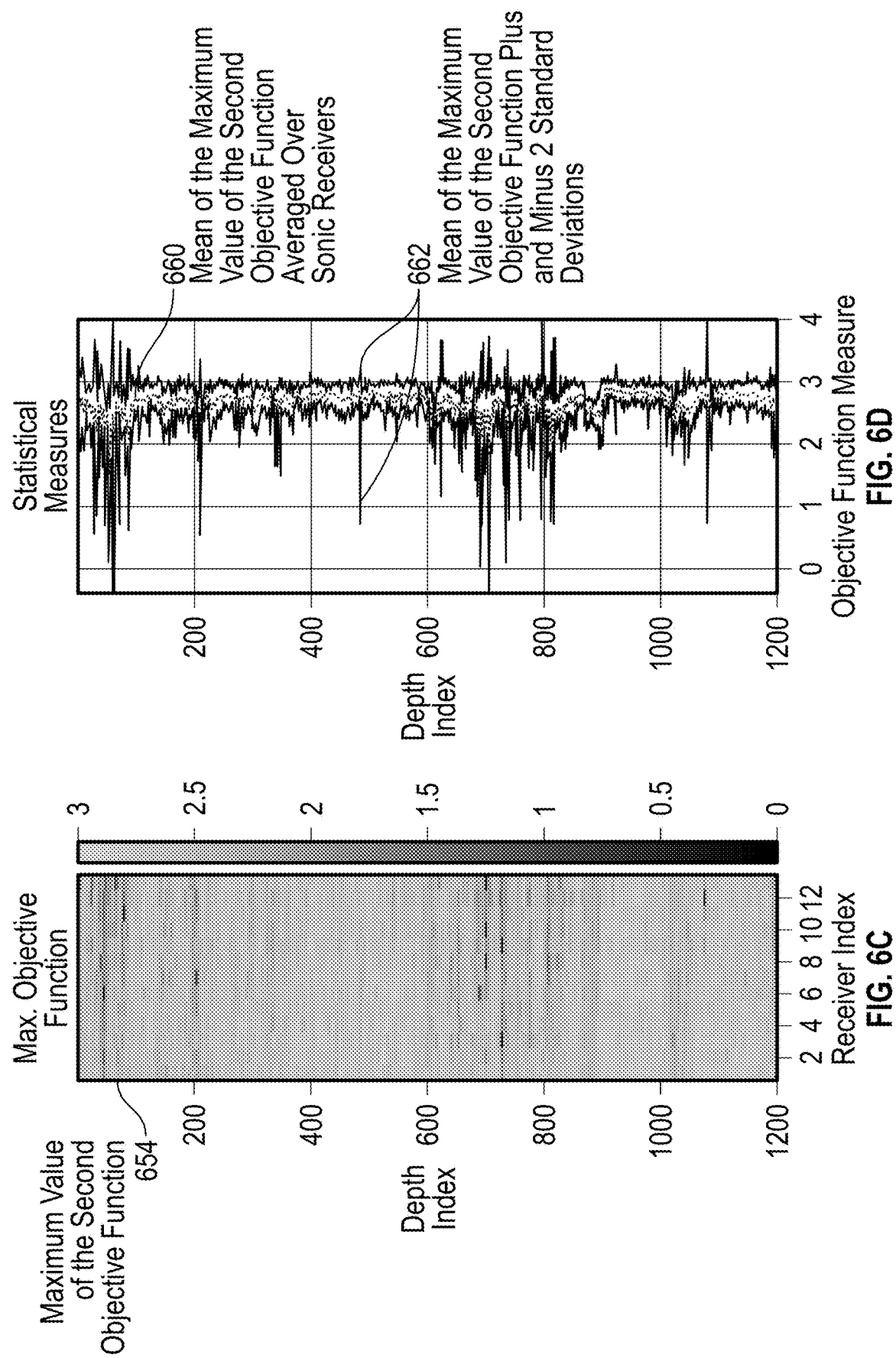

In accordance with one or more embodiments, quality control metrics may be determined for the final picked arrival-times of the target event. FIG. 6C shows one such quality control metric. FIG. 6C shows the maximum value of the second objective function (654) for each sonic receiver (106) and sonic source activation positions along the borehole (108). FIG. 6C offers an important quality control metric and indicate the reliability of the final picked arrival-times (652) of the target event. Light shades indicate a large relative value of the maximum value second objective function (654), and hence a reliable final picked arrival-time. In contrast, dark shades indicate a small relative value of the maximum value of the second objective function (654), and hence a less reliable final picked arrival-time.

FIG. 6D shows statistical quality control metrics in accordance with one or more embodiments. The solid curve shows the mean of the maximum value of the second objective function averaged over sonic receivers (106) for each sonic source activation positions along the borehole (108). FIG. 6D also shows the mean value plus and minus twice the standard deviation (662) of the value of second objective function displayed FIG. 6C as dashed lines. The presence of fractures, borehole breakouts and lithology transitions may the main contributors to the uncertainties in the final picks.

Figure 7:
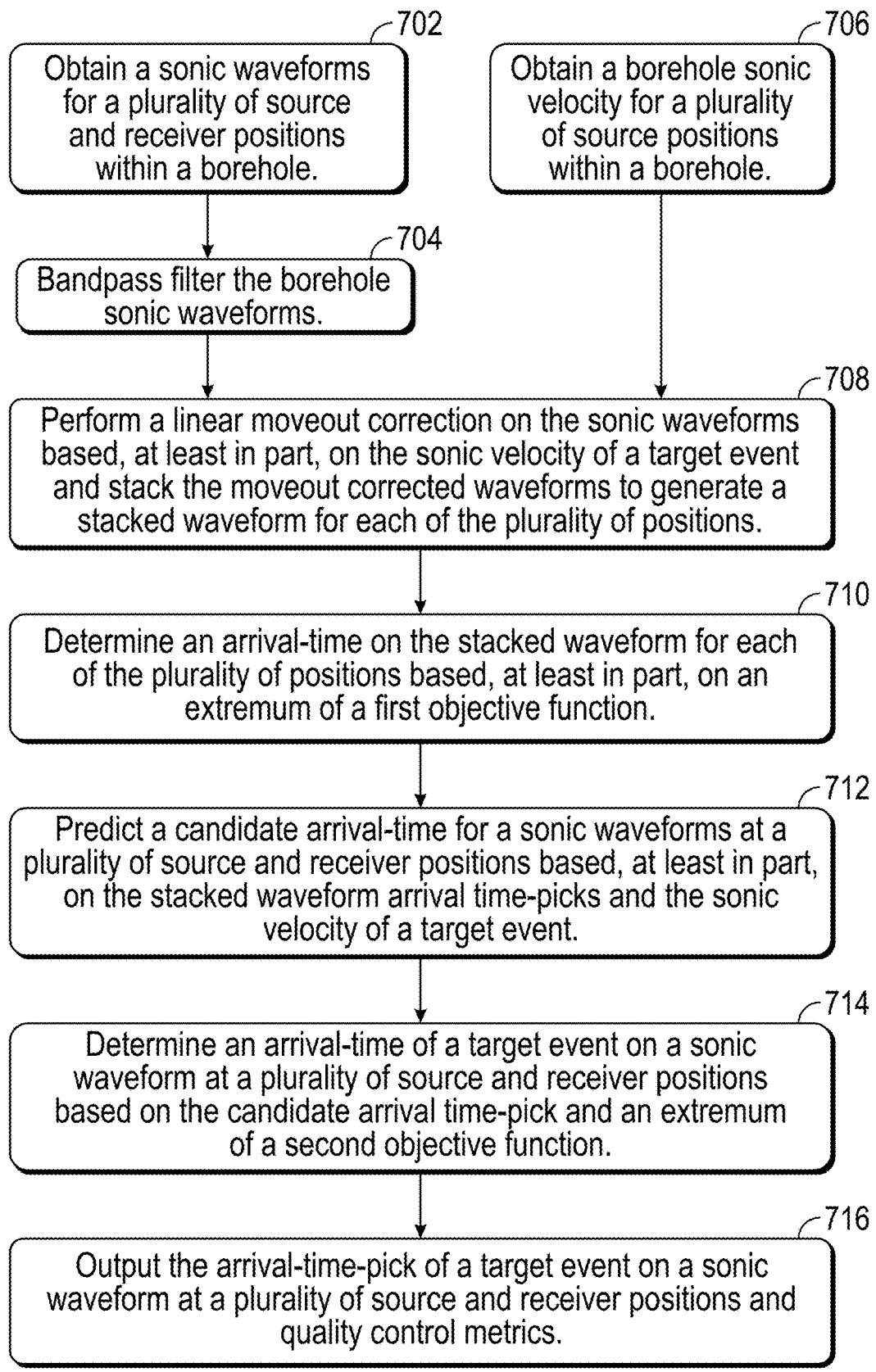
FIG. 7 shows a flowchart, in accordance with one or more embodiments.

FIG. 7 shows a flowchart in accordance with one or more embodiments. Specifically, FIG. 7 describes in detail the steps of the workflow to create the objective function described above. Further, one or more blocks in FIG. 7 may be performed by one or more components as described in FIG. 10 (e.g., computing system 1000 including computer processor(s) 1004 and communication interface 1008). While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 702, sonic waveforms for a plurality of source and receiver positions within a borehole are obtained from a survey acquired with a sonic logging tool. In accordance with one or more embodiments, in Block 704, a band-pass filter may be applied to the sonic waveforms acquired in Block 702. In other embodiments, the sonic waveforms may not be band-passed filtered.

In Block 706, a borehole sonic velocity curve for a plurality of source positions within a borehole is obtained. In one or more embodiments, the sonic velocity curve may be obtained from the sonic waveforms obtained in Block 702, either before or after band-pass filtering. In accordance with other embodiments, the sonic velocity curve may be obtained from other measurements.

In Block 708, a linear moveout correction on the sonic waveforms is performed based, at least in part, on the sonic velocity of a target event. Further, in Block 708 the moveout corrected waveforms may be stacked to generate a stacked waveform for each of the plurality of positions.

In Block 710, an arrival-time on the stacked waveform for each of the plurality of positions is determined based, at least in part, on an extremum of a first objective function (454). The determination of the extremum is depicted in more detail in, and described in the context of, FIG. 8.

In accordance with one or more embodiments, in Block 712, a candidate arrival-time for a target event on a sonic waveforms at a plurality of source and receiver positions is predicted based, at least in part, on the stacked waveform arrival times, and the sonic velocity of a target event. In the preferred embodiment, the candidate arrival-time may be predicted assuming a linear moveout of the target event across the array of sonic receivers.

In Block 714, in accordance with one or more embodiments, an arrival-time of a target event on a sonic waveform at a plurality of source and receiver positions is determined based on the candidate arrival-time pick of the target event and an extremum of a second objective function. The second objective function may have the same functional form as the first objective function (454), in accordance with some embodiments. In accordance with other embodiments, the second objective function may have a different functional form from the first objective function (454). In either case, the first objective function (454) takes stacked waveforms (446) as input variables, whereas second objective function takes sonic waveforms as input variables.

Figure 8:
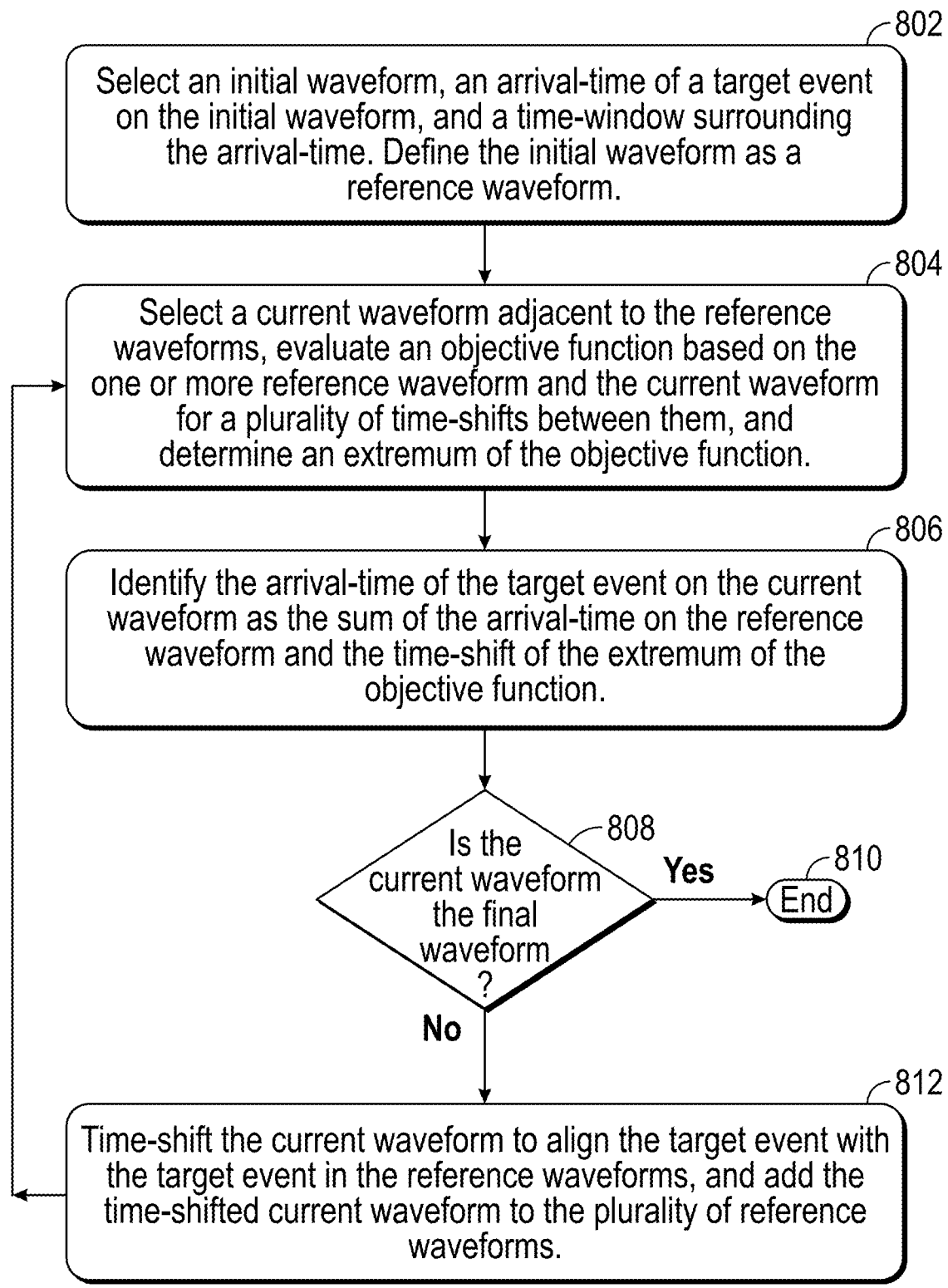
FIG. 8 shows a flowchart, in accordance with one or more embodiments.

FIG. 8 shows a flowchart, in accordance with one or more embodiments, which discloses the steps leading to determining an arrival-time of a target event using the extremum of an objective function. FIG. 8 applies equally to the first objective function (454) disclosed in equation (2) when the waveforms are stacked waveforms (446), and the second objective function disclosed in equation (10) when the waveforms are sonic waveforms.

In Block 802, in accordance with one or more embodiments, an initial waveform is selected, together with an arrival-time of a target event on the initial waveform, and a time-window surrounding the arrival-time. Further the initial waveform is defined to be a reference waveform.

In Block 804, in accordance with one or more embodiments, a current waveform is selected adjacent to the reference waveform, and an objective function based on the reference waveform and the current waveform is evaluated for a plurality of time-shifts between them, and an extremum of the objective function is determined. The extremum may be a maximum, or a minimum, depending on the form selected for the objective function as disclosed in equation (2) and equation (9).

In accordance with one or more embodiments, in Block 806, the arrival-time of the target event on the current waveform is identified as the sum of the arrival-time on the reference waveform, and the time-shift of the extremum of the objective function.

In Block 808, in accordance with one or more embodiments, the workflow checks to determine if the current waveform is the final waveform for which an arrival-time of a target event is required. If the current waveform is the final waveform then the workflow may be terminated in Block 810. If the current waveform is not the final waveform for which an arrival-time of a target event is required, then the workflow may proceed to Block 812.

In Block 812, in accordance with one or more embodiments, the current waveform may be time-shifted to align the target event with the target event in the reference waveforms, and the time-shifted current waveform is added to the plurality of reference waveforms.

Figure 9A:
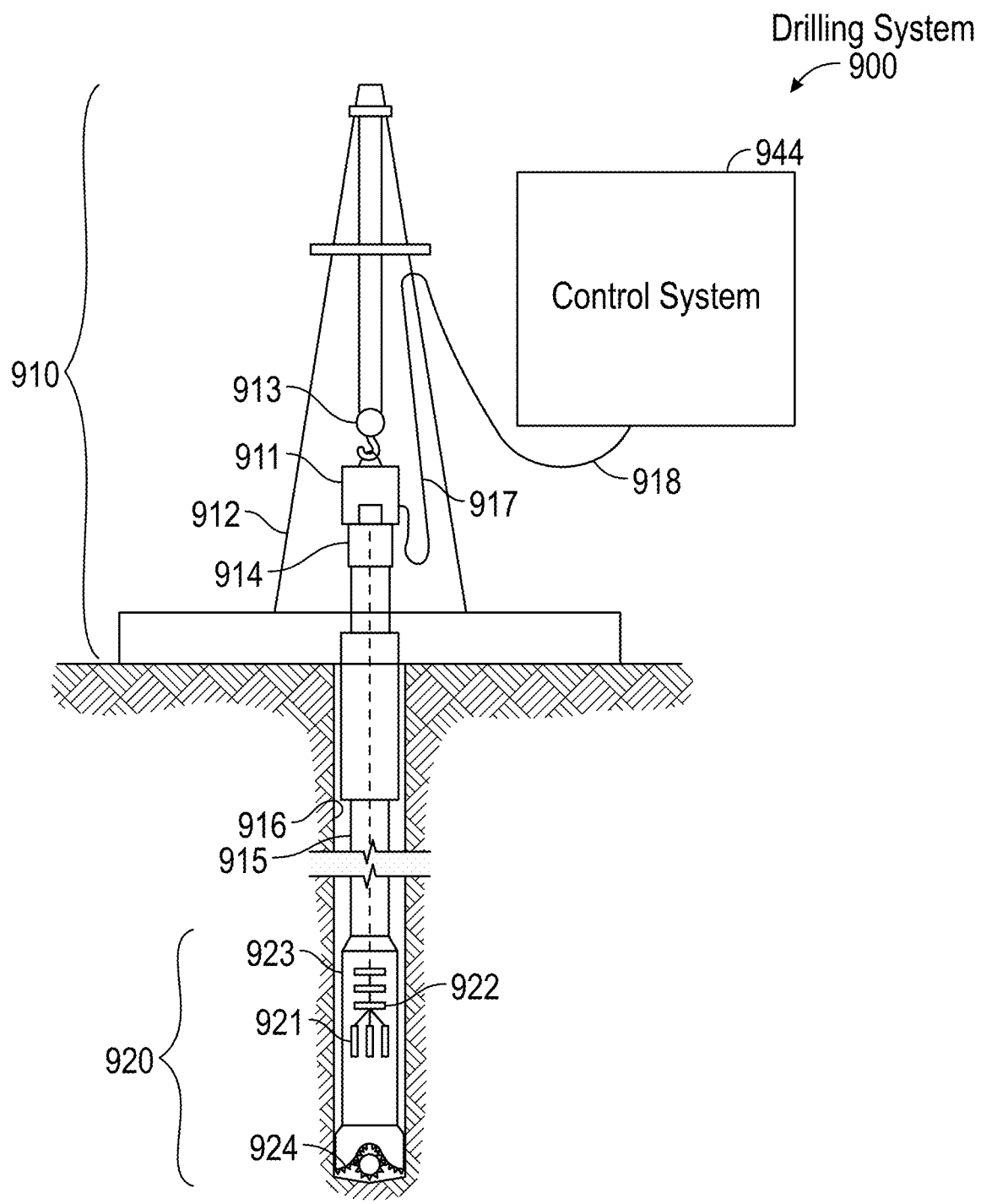
FIGS. 9A and 9B show systems in accordance with one or more embodiments.
Figure 9B:
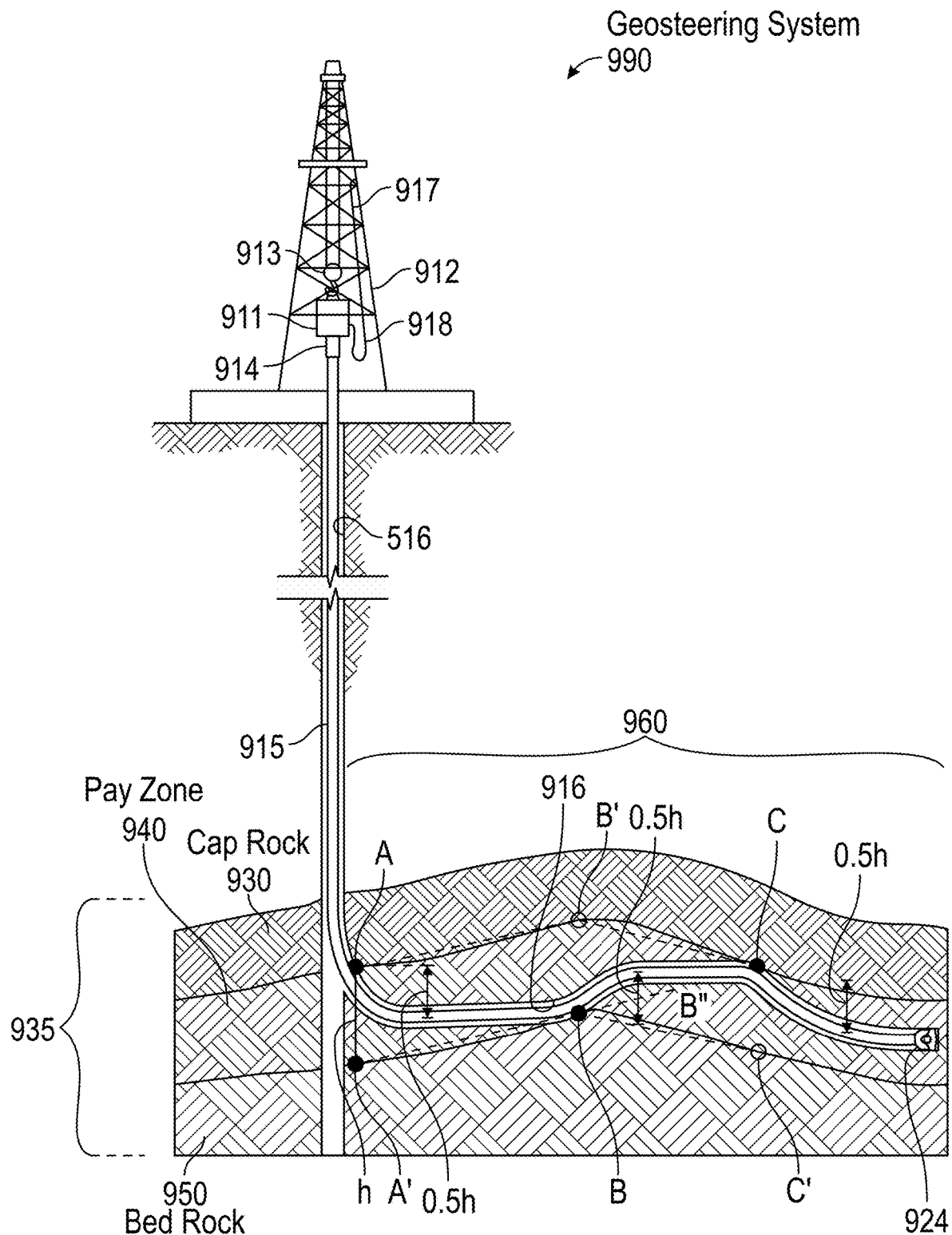

FIGS. 9A and 9B illustrate systems in accordance with one or more embodiments. As shown in FIG. 9A, a drilling system (900) may include a top drive drill rig (910) arranged around the setup of a drill bit logging tool (920). A top drive drill rig (910) may include a top drive (911) that may be suspended in a derrick (912) by a travelling block (913). In the center of the top drive (911), a drive shaft (914) may be coupled to a top pipe of a drill string (915), for example, by threads. The top drive (911) may rotate the drive shaft (914), so that the drill string (915) and a drill bit logging tool (920) cut the rock at the bottom of a wellbore (916). A power cable (917) supplying electric power to the top drive (911) may be protected inside one or more service loops (918) coupled to a control system (944). As such, drilling mud may be pumped into the wellbore (916) through a mud line, the drive shaft (914), and/or the drill string (915).

Moreover, when completing a well, casing may be inserted into the wellbore (916). The sides of the wellbore (916) may require support, and thus the casing may be used for supporting the sides of the wellbore (916). As such, a space between the casing and the untreated sides of the wellbore (916) may be cemented to hold the casing in place. The cement may be forced through a lower end of the casing and into an annulus between the casing and a wall of the wellbore (916). More specifically, a cementing plug may be used for pushing the cement from the casing. For example, the cementing plug may be a rubber plug used to separate cement slurry from other fluids, reducing contamination and maintaining predictable slurry performance. A displacement fluid, such as water, or an appropriately weighted drilling mud, may be pumped into the casing above the cementing plug. This displacement fluid may be pressurized fluid that serves to urge the cementing plug downward through the casing to extrude the cement from the casing outlet and back up into the annulus.

As further shown in FIG. 9A, sensors (921) may be included in a sensor assembly (923), which is positioned adjacent to a drill bit (924) and coupled to the drill string (915). Sensors (921) may also be coupled to a processor assembly (923) that includes a processor, memory, and an analog-to-digital converter (922) for processing sensor measurements. For example, the sensors (921) may include acoustic sensors, such as accelerometers, measurement microphones, contact microphones, and hydrophones. Likewise, the sensors (921) may include other types of sensors, such as transmitters and receivers to measure resistivity, gamma ray detectors, etc. The sensors (921) may include hardware and/or software for generating different types of well logs (such as acoustic logs or density logs) that may provide well data about a wellbore, including porosity of wellbore sections, gas saturation, bed boundaries in a geologic formation, fractures in the wellbore or completion cement, and many other pieces of information about a formation. If such well data is acquired during drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (900) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

The control system (944) may be coupled to the sensor assembly (923) in order to perform various program functions for up-down steering and left-right steering of the drill bit (924) through the wellbore (916). More specifically, the control system (944) may include hardware and/or software with functionality for geosteering a drill bit through a formation in a lateral well using sensor signals, such as drilling acoustic signals or resistivity measurements. For example, the formation may be a reservoir region, such as a pay zone, bed rock, or cap rock.

Turning to geosteering, geosteering may be used to position the drill bit (924) or drill string (915) relative to a boundary between different subsurface layers (e.g., overlying, underlying, and lateral layers of a pay zone) during drilling operations. In particular, measuring rock properties during drilling may provide the drilling system (900) with the ability to steer the drill bit (924) in the direction of desired hydrocarbon concentrations. As such, a geosteering system may use various sensors located inside or adjacent to the drilling string (915) to determine different rock formations within a wellbore's path. In some geosteering systems, drilling tools may use resistivity or acoustic measurements to guide the drill bit (924) during horizontal or lateral drilling.

Turning to FIG. 9B, FIG. 9B illustrates some embodiments for steering a drill bit through a lateral pay zone using a geosteering system (990). As shown in FIG. 9B, the geosteering system (990) may include the drilling system (900) from FIG. 9A. In particular, the geosteering system (990) may include functionality for monitoring various sensor signatures (e.g., an acoustic signature from acoustic sensors) that gradually or suddenly change as a well path traverses a cap rock (930), a pay zone (940), and a bed rock (950). Because of the sudden change in lithology between the cap rock (930) and the pay zone (940), for example, a sensor signature of the pay zone (940) may be different from the sensor signature of the cap rock (930). When the drill bit (924) drills out of the pay zone (940) into the cap rock (930), a detected amplitude spectrum of a particular sensor type may change suddenly between the two distinct sensor signatures. In contrast, when drilling from the pay zone (940) downward into the bed rock (950), the detected amplitude spectrum may gradually change.

During the lateral drilling of the wellbore (916), preliminary upper and lower boundaries of a formation layer's thickness may be derived from a geophysical survey and/or an offset well obtained before drilling the wellbore (916). If a vertical section (935) of the well is drilled, the actual upper and lower boundaries of a formation layer (i.e., actual pay zone boundaries (A, A')) and the pay zone thickness (i.e., A to A') at the vertical section (935) may be determined. Based on this well data, an operator may steer the drill bit (924) through a lateral section (960) of the wellbore (916) in real time. In particular, a logging tool may monitor a detected sensor signature proximate the drill bit (924), where the detected sensor signature may continuously be compared against prior sensor signatures, e.g., of the cap rock (930), pay zone (940), and bed rock (950), respectively. As such, if the detected sensor signature of drilled rock is the same or similar to the sensor signature of the pay zone (940), the drill bit (924) may still be drilling in the pay zone (940). In this scenario, the drill bit (924) may be operated to continue drilling along its current path and at a predetermined distance (0.5 h) from a boundary of a formation layer. If the detected sensor signature is same as or similar to the prior sensor signatures of the cap rock (930) or the bed rock (950), respectively, then the control system (944) may determine that the drill bit (924) is drilling out of the pay zone (940) and into the upper or lower boundary of the pay zone (940). At this point, the vertical position of the drill bit (924) at this lateral position within the wellbore (916) may be determined and the upper and lower boundaries of the pay zone (940) may be updated, (for example, positions B and C in FIG. 9B). In some embodiments, the vertical position at the opposite boundary may be estimated based on the predetermined thickness of the pay zone (940), such as positions B' and C'.

While FIGS. 9A, and 9B shows various configurations of components, other configurations may be used without departing from the scope of the disclosure. For example, various components in FIGS. 9A, and 9B may be combined to create a single component. As another example, the functionality performed by a single component may be performed by two or more components.

Figure 10:
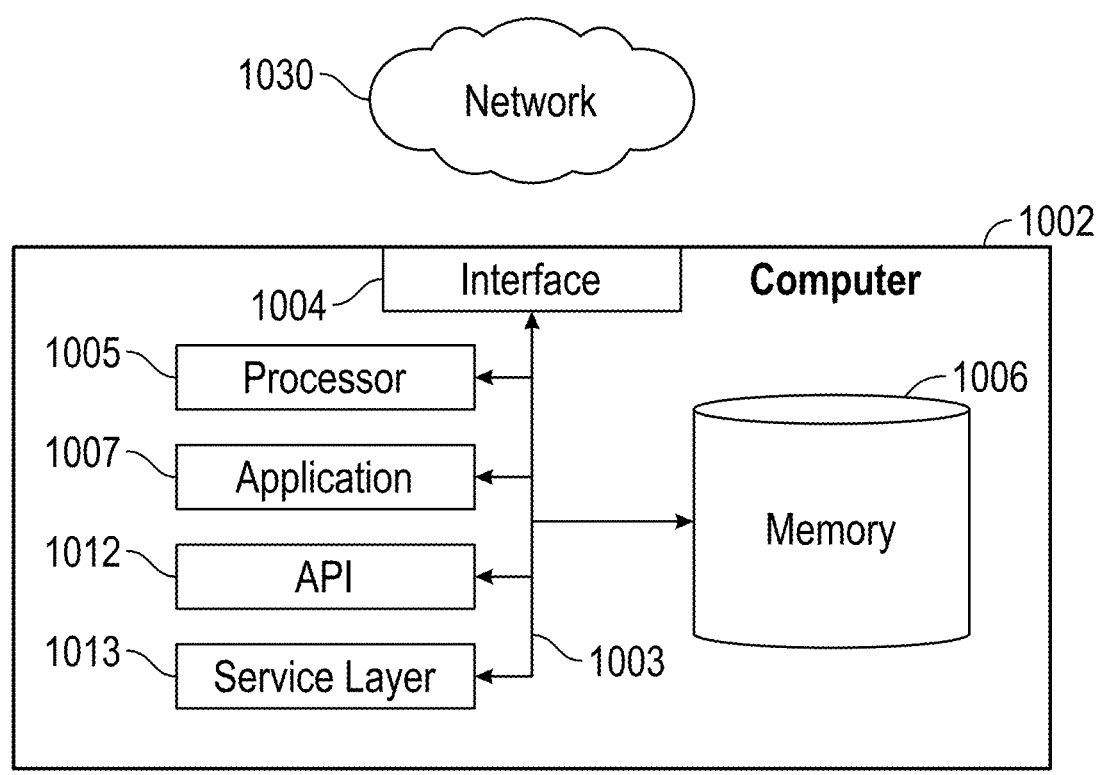
FIG. 10 shows a computer system, in accordance with one or more embodiments.

Embodiments may be implemented on a computer system. FIG. 10 is a block diagram of a computer system (1002) used to provide computational functionalities associated with described algorithms, methods, functions, processes, flows, and procedures as described in the instant disclosure, according to an implementation. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both)

of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or other suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for automatic picking of borehole acoustic events, the method comprising:
    obtaining, by a computer processor, a plurality of sonic waveforms for each of a plurality of source and receiver positions along a borehole;
    obtaining, by the computer processor, a sonic wave propagation velocity curve of a target event for the plurality of source and receiver positions along the borehole;
    performing, by the computer processor, a linear moveout correction on the sonic waveforms based, at least in part, on the sonic wave propagation velocity of the target event for the plurality of source and receiver positions along the borehole;
    stacking, by the computer processor, the linear moveout corrected sonic waveforms to generate a stacked waveform at the plurality of source and receiver positions along the borehole;
    determining, by the computer processor, an arrival-time of the target event on the stacked waveform for each of the plurality of source and receiver positions along the borehole based, at least in part on an extremum of a first objective function based on the stacked waveforms,
    wherein the first objective function includes first scalar weights selected by a user;
    predicting, by the computer processor, a candidate arrival-time of the target event for the sonic waveform at the plurality of source and receiver positions based, at least in part, on the arrival-time of the target event on the stacked waveform for the plurality of positions, and the sonic wave propagation velocity of the target event for the plurality of source and receiver positions within the borehole;
    determining, by the computer processor, an arrival-time for the target event on the sonic waveform at the plurality of source and receiver positions within the borehole based, at least in part on the candidate arrival-time of the target event and an extremum of a second objective function based on the sonic waveforms,
    wherein the second objective function includes second scalar weights selected by the user;
    determining, by the computer processor, a well path through a subterranean region of interest using the sonic waveform; and
    drilling and logging the well path using a drilling system.

2. The method of claim 1,
    wherein the obtaining, by a computer processor, a plurality of sonic waveforms for a plurality of source and receiver positions along a borehole further comprises band-pass filtering the sonic waveform.

3. The method of claim 1,
    wherein the obtaining, by the computer processor, a sonic wave propagation velocity curve of the target event for a plurality of positions along the borehole further comprises:
        determining the sonic wave propagation velocity of the target event from the sonic waveforms for a plurality of source and receiver positions along a borehole.

4. The method of claim 1,
    wherein the first objective function is based, at least in part, on one or more reference stacked waveforms, and a current stacked waveform for which the arrival-time of the target event is to be determined.

5. The method of claim 1,
    wherein the extremum of the first objective function, and the extremum of the second objective function, is selected from the group consisting of a maximum of the objective function, and a minimum of the objective function.

6. The method of claim 4,
    wherein the first objective function further comprise terms quantifying one or more of the semblance, phase consistency, energy ratio, and time-pick consistency, between the reference stacked waveform and the current stacked waveform.

7. The method of claim 1,
    wherein the obtaining, by a computer processor, a sonic waveform for a plurality of source and receiver positions within a borehole further comprises:
        obtaining, an initial arrival-time and a time-window enclosing the initial arrival-time.

8. The method of claim 1:
    wherein the first objective function is based, at least in part, on the portion of the stacked waveform within the first time-window enclosing the initial arrival-time.

9. The method of claim 1:
    wherein predicting, by the computer processor, a candidate arrival-time for the sonic waveform at the plurality of source and receiver positions based, at least in part, on the arrival-time on the stacked waveform for a plurality of positions, further comprises:
        incrementing the arrival time-pick on the stacked waveform by the product of the sonic wave propagation velocity of the target event, and the distance between the position of the sonic waveform and the position of the stacked waveform.

10. The method of claim 1,
    wherein the second objective function is based, at least in part, on one or more reference sonic waveforms, and a current sonic waveform for which the arrival-time is to be determined.

11. The method of claim 1,
    wherein the second objective function further comprise terms quantifying one or more of the semblance, phase consistency, energy ratio, and time-pick consistency, between one or more reference sonic waveforms and a current sonic waveform.

12. The method of claim 1:
    wherein the second objective function is based, at least in part, on the portion of the reference sonic waveforms within the second time-window enclosing the candidate arrival-time.

13. A non-transitory computer readable medium storing instructions executable by a computer processor for automatic picking of borehole acoustic events, the instructions comprising functionality for:
    obtaining a plurality of sonic waveforms for each of a plurality of source and receiver positions along a borehole;
    obtaining a sonic wave propagation velocity curve of a target event for the plurality of each of source and receiver positions along the borehole;

performing a linear moveout correction on the sonic waveforms based, at least in part, on the sonic wave propagation velocity of the target event for the plurality of source and receiver positions along the borehole;

stacking the linear moveout corrected sonic waveforms to generate a stacked waveform at the plurality of source and receiver positions along the borehole;

determining an arrival-time of the target event on the stacked waveform for each of the plurality of source and receiver positions along the borehole based, at least in part, on an extremum of a first objective function based on the stacked waveforms, wherein the first objective function includes first scalar weights selected by a user;

predicting a candidate arrival-time of the target event for the sonic waveform at the plurality of source and receiver positions based, at least in part, on the arrival-time of the target event on the stacked waveform for the plurality of positions, and the sonic wave propagation velocity of the target event for the plurality of source and receiver positions within the borehole; and determining an arrival-time for the target event on the sonic waveform at the plurality of source and receiver positions within the borehole based, at least in part, on the candidate arrival-time of the target event and an extremum of a second objective function sonic waveforms, wherein the second objective function includes second scalar weights selected by the user;

determining, by the computer processor, a well path through a subterranean region of interest using the sonic waveform; and drilling and logging the well path using a drilling system.

14. The non-transitory computer readable medium of claim 13,
wherein obtaining a plurality of sonic waveforms for a plurality of source and receiver positions along a borehole further comprises band-pass filtering the sonic waveform.

15. The non-transitory computer readable medium of claim 13,
wherein the first objective function is based, at least in part, on one or more reference stacked waveforms, and a current stacked waveform for which the arrival-time of the target event is to be determined.

16. The non-transitory computer readable medium of claim 13,
wherein the first objective function further comprise terms quantifying one or more of the semblance, phase consistency, energy ratio, and time-pick consistency, between the reference stacked waveform and the current stacked waveform.

17. The non-transitory computer readable medium of claim 13:
wherein predicting a candidate arrival-time for the sonic waveform at the plurality of source and receiver positions based, at least in part, on the arrival-time on the stacked waveform for a plurality of positions, further comprises:
incrementing the arrival time-pick on the stacked waveform by the product of the sonic wave propagation velocity of the target event, and the distance between the position of the sonic waveform and the position of the stacked waveform.

18. The non-transitory computer readable medium of claim 13,
wherein the second objective function is based, at least in part, on one or more reference sonic waveforms, and a current sonic waveform for which the arrival-time is to be determined.

19. The non-transitory computer readable medium of claim 13,
wherein the second objective function further comprise terms quantifying one or more of the semblance, phase consistency, energy ratio, and time-pick consistency, between one or more reference sonic waveforms and a current sonic waveform.

\* \* \* \* \*